Nov. 24, 1931.    A. J. MICHELIN    1,833,718
TIRE FOR RAILWAY VEHICLES
Filed Nov. 10, 1930
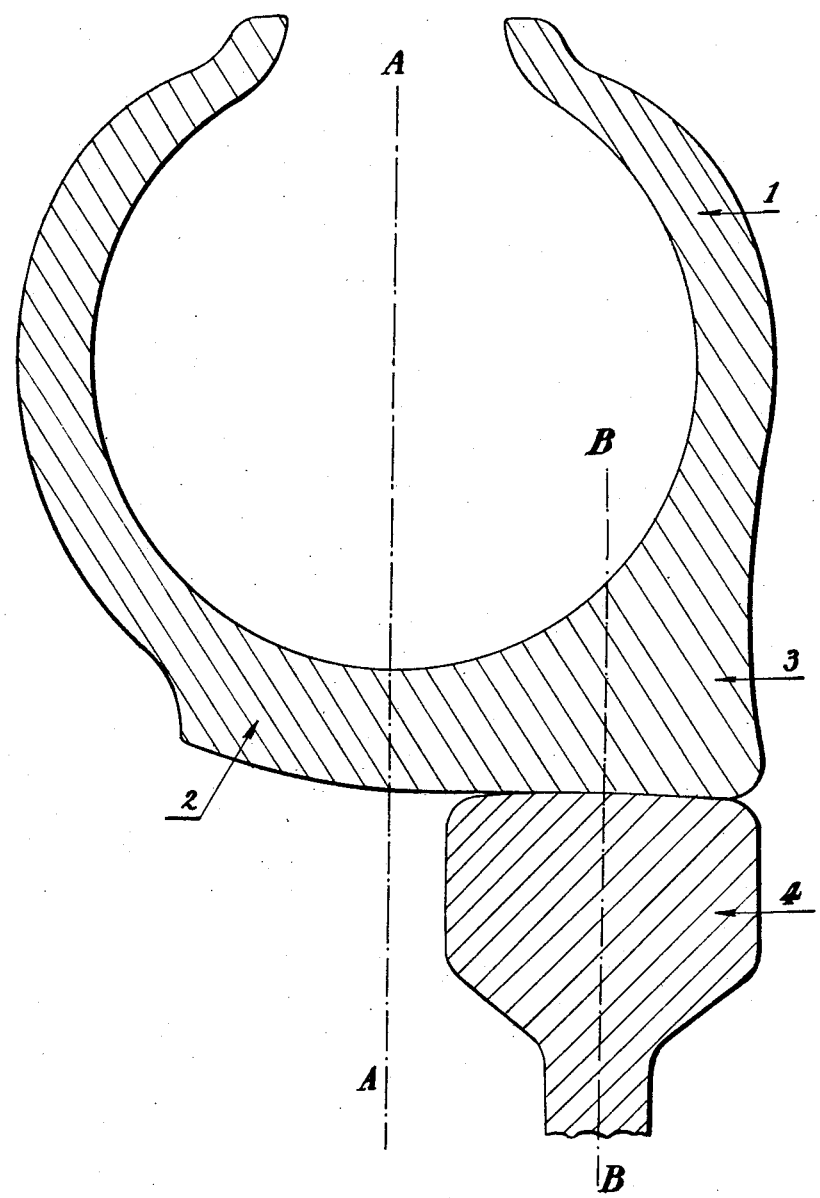
Inventor,
André J. Michelin,
By Henry Orth, atty.

Patented Nov. 24, 1931

1,833,718

UNITED STATES PATENT OFFICE

ANDRÉ JULES MICHELIN, OF PARIS, FRANCE, ASSIGNOR TO MICHELIN ET CIE., OF CLERMONT-FERRAND, FRANCE, A CORPORATION OF FRANCE

TIRE FOR RAILWAY VEHICLES   REISSUED

Application filed November 10, 1930, Serial No. 494,768, and in France November 21, 1929.

My invention has for its object an improvement in the cover treads of pneumatic tires adapted for use in connection with railway vehicles. This improvement has for its result to provide a larger tread surface and to permit of the tire being capable of adapting itself to variations in the distance between rails, for instance in curves.

To this effect, according to my invention, the pneumatic tire comprises a dissymmetric tread, the horizontal surface thereof extending more on one side than on the other.

A preferred embodiment of my invention will be described with reference to the appended drawing, given merely by way of example and which shows a vertical section of a pneumatic tire cover according to my invention.

The tread 2 of the cover 1 of the pneumatic tire is laterally extended, as shown at 3, on the side that bears on rail 4. The axis of the pneumatic tire is shown in A—A, and the axis of the rail in B—B.

It will readily be understood that even under the most unfavourable circumstances, for instance in curves, when the flange of one of the wheels comes in contact with the rail on one side while the flange of the opposed wheel is about one and a half inch distant from the other rail, a maximum tread surface is always obtained, owing to the dissymmetric disposition of the tread.

While I have in the above description endeavored to disclose what I believe to be an efficient and simple embodiment of my invention, it is to be understood that the invention is not limited by the specific details as shown, but that the tread surface could be increased on one side in any other suitable manner without departing from the spirit of my invention as comprehended within the scope of the appended claims.

What I claim is:

1. In covers of pneumatic tires adapted to be fitted on railway vehicles, a cylindrical laterel extension of the tread on one side only, giving the cover a dissymmetric shape, whereby an increased tread surface of the tire is obtained.

2. In covers of pneumatic tires adapted to be fitted on railway vehicles, a cylindrical lateral extension of the tread adapted to bear on the rail and so disposed that the axis of the tire is normally at a certain distance from the axis of the rail, whereby an increased tread surface of the tire is obtained, and the tire can readily adjust itself to variations in the distance between rails.

3. A cover for a pneumatic tire adapted to be run on a rail which comprises a relatively wide cylindrical smooth tread surface, the plane of symmetry of which tread surface is parallel to, and outwardly disposed with respect to, the plane of symmetry of the inner surface of said cover.

In testimony that I claim the foregoing as my invention, I have signed my name.

ANDRÉ JULES MICHELIN.